Dec. 16, 1930.   S. R. KELLY   1,785,314
HOSE MENDER
Filed March 11, 1927

Inventor
S. R. Kelly,

By Clarence A. O'Brien
Attorney

Patented Dec. 16, 1930

1,785,314

UNITED STATES PATENT OFFICE

SIDNEY R. KELLY, OF GEM, IDAHO

HOSE MENDER

Application filed March 11, 1927. Serial No. 174,530.

This invention relates to new and useful improvements in mending devices for use in the repairing of leaky hoses in mine work. In the use of air, water or steam hoses it frequently happens that the hose becomes damaged at one or more points throughout its length and becomes leaky rendering the entire hose unfit for further use.

There are a number of hose mending devices now on the market that attempt to repair leaky hoses by cutting the same at the damaged points and then covering the sections and tightly securing the same together. Previous attempts to so repair a hose have met with only partial success, mainly due to the fact that the joined sections of the hose will invariably pull apart, which will require the frequent renewal or reapplication of the particular mender being used.

The primary object of this invention is to provide a highly novel, simple, and inexpensive hose mender that may be quickly applied to the ends of a pair of damaged hose sections and that is so constructed as to substantially prevent the drawing apart of the sections after my device has been rigidly applied thereto.

With the foregoing and other objects in view as the nature of the invention will be better understood, the same comprises the novel form, combination and arrangement of parts hereinafter more fully described, shown in the accompanying drawing and claimed.

In the drawing wherein like reference characters indicate corresponding parts throughout the several views.

Figure 1:
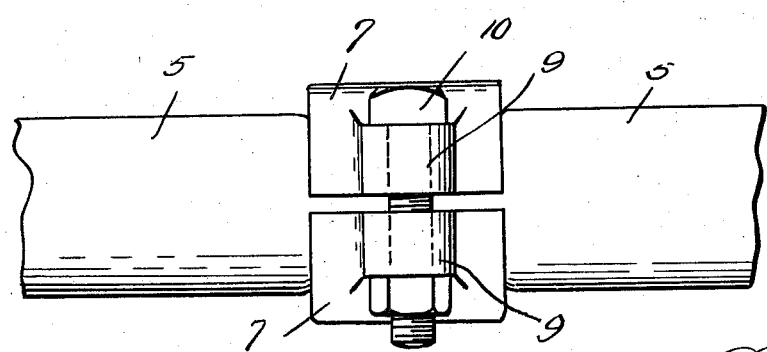
Figure 1 is a side elevation of a hose mender constructed in accordance with the present invention, and shown applied about two hose sections at their meeting ends for mending the same.
Figure 2:
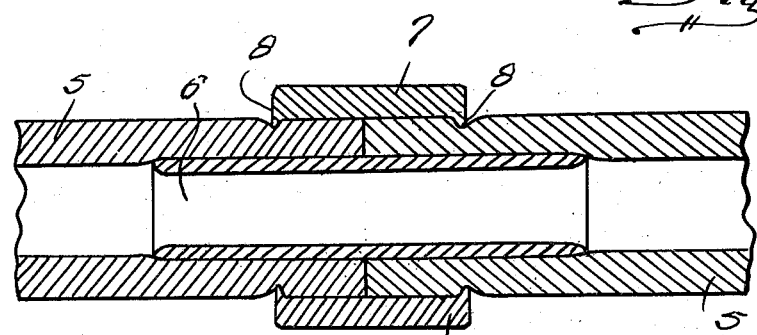
Figure 2 is a longitudinal section therethrough.
Figures 3, 4:
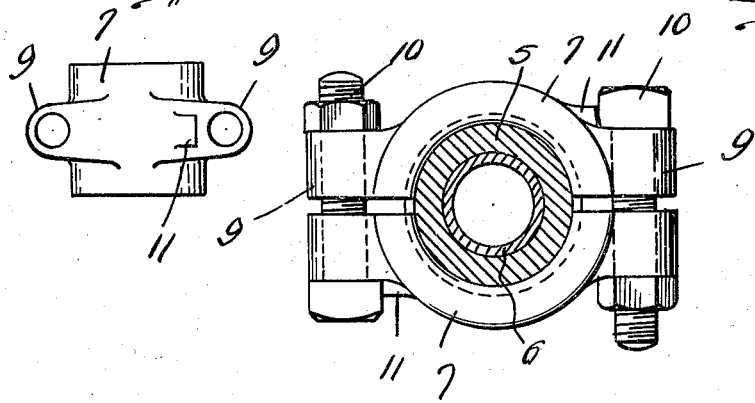
Figure 3 is a transverse section through the hose disclosing the exterior clamp sections of the device in side elevation.
Figure 4 is a top plan view of one of said clamp sections.

Now having particular reference to the drawing, 5—5 designates fragmentarily a pair of hose sections, to be joined by my improved mender. In actual practice after these sections have been provided by cutting the hose at the damaged point, there is inserted within the ends an elongated metallic tube 6, of a diameter greater than the diameter of the interior of the hose sections so that the same will tightly engage the interior surface of the sections when arranged therein. The particular mender further consists of a pair of semi-circular metallic clamp sections 7—7 for engagement over the meeting edges of the hose sections 5—5 as in Figure 2. The opposite ends of the sections 7—7 are formed with inwardly extending tapered lips 8—8 for biting into the exterior surface of the hose sections for preventing the pulling away of the same.

The sides of each section 7 are formed with lateral ears 9—9 having openings therethrough so that the ears of the sections may be joined by bolt and nut connections 10—10 which bolt and nut connections serve as means whereby the sections 7—7 are tightly drawn together around the meeting ends of the pipe sections 5—5 for causing the lips 8—8 of each clamp section to firmly bite into the surface of the pipe sections for preventing the same from pulling apart as previously suggested. Furthermore, these clamp sections 7—7 serve to compress the ends of the hose sections between the internal tubular sleeve 6 and the sections of the clamp to provide a water tight joint between the tube sections and said tubular sleeve 6.

One of the lugs 9 of each clamp section 7 is formed inwardly of its opening with an abutment 11 against which the head of one of the bolt and nut connections will engage for preventing the accidental turning of the bolt within the registering openings of the clamp sections ears, after the sections have been tightened.

It will thus be seen that I have provided a highly novel, simple, and relatively inexpensive hose mender that is well adapted for all the purposes heretofore designated, even though I have herein shown and described the invention as consisting of certain detail structural elements it is nevertheless to be understood that some change may be made therein without affecting the spirit and scope of the appended claim.

Having thus described the invention, what I claim is:—

In a mending device for the adjacent ends of a pair of hose sections, a tube of greater diameter than the inner diameter of the hose section, said tube being of uniform diameter throughout its entire length and having a smooth outer surface, the end portions of the tube being forcibly fitted in the respective ends of the abutting hose sections, a pair of identical semi-circular clamping sections arranged around the hose sections at their abutting ends, said tube being of such length as to have its ends extending beyond the respective ends of the clamping sections, means for securing the sections together in tight engagement around the hose sections, an inwardly extending tapered lip formed at the ends of each section for biting engagement with the outer surface of the respective hose sections and for compressing the ends of the hose sections between the internal tube and the sections of the clamp.

In testimony whereof I affix my signature.

SIDNEY R. KELLY.